United States Patent Office.

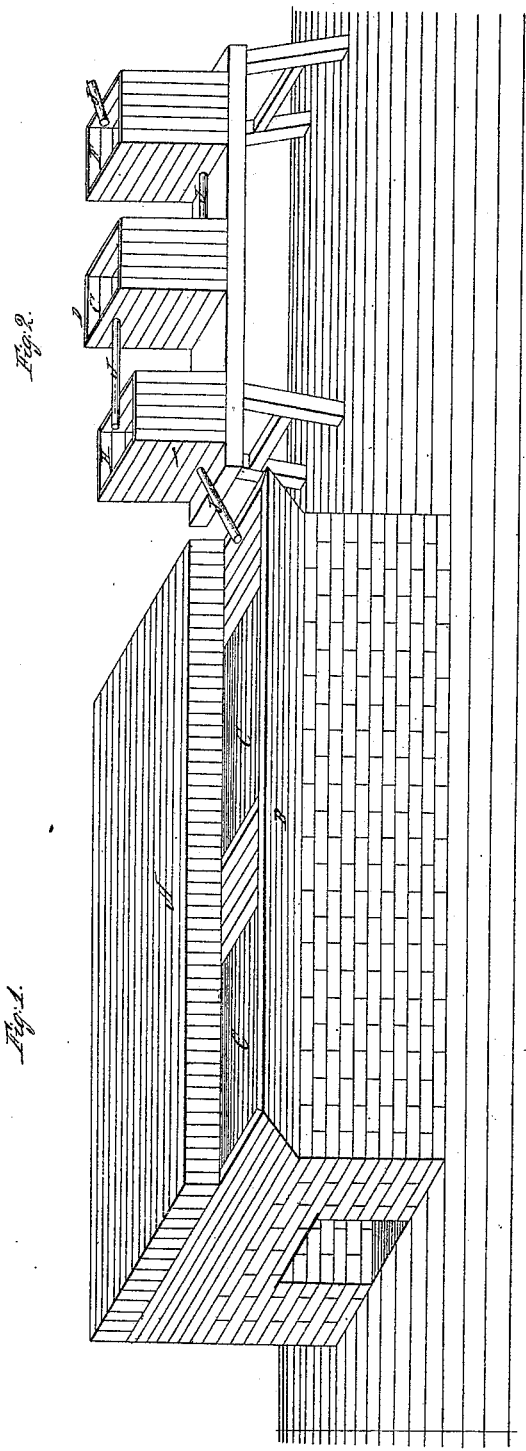

JAMES R. HOPKINS, OF DAYTON, OHIO, ASSIGNOR TO HIMSELF AND JACOB O. JOYCE, OF SAME PLACE.

*Letters Patent No. 61,200, dated January 15, 1867.*

---

IMPROVEMENT IN FILTERING, EVAPORATING, AND GRANULATING SACCHARINE LIQUIDS.

---

*The Schedule referred to in these Letters Patent and making part of the same.*

---

TO ALL WHOM IT MAY CONCERN:

Be it known that I, JAMES R. HOPKINS, of Dayton, in the county of Montgomery, in the State of Ohio have invented a new and improved Process of Filtering, Evaporating, and Granulating Saccharine Liquids; and I do declare that the following is a full and exact description thereof, reference being had to the accompanying drawings, making a part of this specification, in which—

Figure 1 is a perspective view of evaporating-pan with cover on.

Figure 2 is a perspective view of the filtering and purifying tanks.

Similar letters of reference indicate corresponding parts in the several figures.

The object of the invention is to produce more rapid evaporation by constructing a lid or cover to an evaporating-pan. Provision is made for leaving a portion of the evaporator uncovered in order to allow sufficient space for removing the scum that will flow to the open or cooler portion of the evaporating-pan; also, for filtering the juice before it enters the evaporating-pan by passing it through tanks or boxes containing straw, clay, and marble chips or spalls; also, for granulating by introducing cold water into the evaporator when the sirup arrives at the consistency of about forty degrees by the saccharometer.

To enable others skilled in the art to understand my invention, I will describe its construction and operation.

In the accompanying drawing, A represents the lid or cover on the evaporating-pan, B. This cover or lid is constructed out of wood, or any suitable material, and attached to the evaporating-pan, B, by hinges, so it can be opened and closed at pleasure. The object of this lid or cover, A, is to retain the steam. Confining the heat, and thereby causing more rapid evaporation, and having only a part of the evaporating-pan, B, covered, is for the purpose of leaving sufficient space for removing the scum that will flow to the front or cooler portion of the evaporator, which open space is represented by letters C C on drawing. Letter D, fig. 2, represents the filtering process. F, G, and H; these tanks may be constructed square or round. Tank F I fill about one-half full of straw; on the straw I place about two inches of common yellow clay, then straw on top of clay to within six inches of top of tank. Tank G I fill with straw. Tank H I fill with marble chips. The juice from the mill or receiver flows into the filtering tanks, and thence to the evaporating-pan, by means of the pipes or conduits, J J J J. The object of this filtering arrangement is that all impurities may be removed from the juice before it enters the evaporating-pan, B, causing it to granulate more readily, which I produce in the following manner: As soon as the sirup arrives at the consistency of about forty degrees by the saccharometer, I add cold water to the amount of about one pint to eight gallons of sirup, stir rapidly for from one to three minutes, then draw off by means of spout or conduit to the cooler, where it will granulate in from twenty-four to thirty hours.

Having described my invention, what I claim as new, and desire to secure by Letters Patent, is—

1. The evaporator lid or cover A, as described and for the purposes set forth.

2. The mode herein described for filtering and purifying the juice in combination with the granulating process, substantially as and for the purposes set forth.

3. The mode herein set forth for producing granulation in combination with the evaporator lid A and the filtering process, substantially as described.

JAS. R. HOPKINS.

Witnesses:
J. O. JOYCE,
THOS. D. MITCHELL.